(12) United States Patent
Okada et al.

(10) Patent No.: US 10,858,808 B2
(45) Date of Patent: Dec. 8, 2020

(54) EXCAVATOR

(71) Applicant: SUMITOMO HEAVY INDUSTRIES, LTD., Tokyo (JP)

(72) Inventors: Junichi Okada, Yokosuka (JP); Kazunori Hiranuma, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 114 days.

(21) Appl. No.: 16/128,521

(22) Filed: Sep. 12, 2018

(65) Prior Publication Data

US 2019/0017248 A1 Jan. 17, 2019

Related U.S. Application Data

(63) Continuation of application No. PCT/JP2017/012648, filed on Mar. 28, 2017.

(30) Foreign Application Priority Data

Mar. 31, 2016 (JP) .................. 2016-072763

(51) Int. Cl.
| | |
|---|---|
| *E02F 9/26* | (2006.01) |
| *E02F 9/24* | (2006.01) |
| *E02F 9/20* | (2006.01) |
| *G01M 1/12* | (2006.01) |
| *E02F 3/30* | (2006.01) |
| *E02F 3/32* | (2006.01) |

(52) U.S. Cl.
CPC .................. *E02F 9/26* (2013.01); *E02F 9/20* (2013.01); *E02F 9/24* (2013.01); *G01M 1/122* (2013.01); *E02F 3/301* (2013.01); *E02F 3/32* (2013.01)

(58) Field of Classification Search
CPC ....... E02F 9/26; E02F 9/20; E02F 9/24; E02F 3/301; E02F 3/32; G01M 1/122
See application file for complete search history.

(56) References Cited

U.S. PATENT DOCUMENTS

| | | | | |
|---|---|---|---|---|
| 5,701,691 A * | 12/1997 | Watanabe | ............... | E02F 3/435 172/4 |
| 5,835,874 A * | 11/1998 | Hirata | ..................... | E02F 3/435 701/50 |
| 5,918,527 A * | 7/1999 | Haga | ..................... | E02F 9/2025 91/363 R |
| 6,098,322 A * | 8/2000 | Tozawa | ................... | E02F 3/437 37/414 |
| 7,441,404 B2 * | 10/2008 | Devier | .................... | E02F 3/431 60/368 |
| 7,748,279 B2 * | 7/2010 | Budde | .................. | E02F 9/0841 73/861.04 |

(Continued)

FOREIGN PATENT DOCUMENTS

| | | |
|---|---|---|
| JP | H05-319785 A | 12/1993 |
| JP | 2007/186953 A | 7/2007 |

(Continued)

*Primary Examiner* — Behrang Badii
*Assistant Examiner* — Daniel L Greene
(74) *Attorney, Agent, or Firm* — HEA Law PLLC (57) ABSTRACT

An excavator attachment is attached to a rotating platform of an excavator. A display unit visually displays a predicted stability indicating stability of the posture of the excavator after the excavator is manipulated.

14 Claims, 8 Drawing Sheets

(56) References Cited

U.S. PATENT DOCUMENTS

| | | | |
|---|---|---|---|
| 8,065,060 B2* | 11/2011 | Danko | B25J 9/1628 |
| | | | 700/11 |
| 8,768,581 B2 | 7/2014 | Mizuochi et al. | |
| 9,348,327 B2 | 5/2016 | Mizuochi et al. | |
| 9,745,727 B2* | 8/2017 | Galan Benzal | E02F 9/267 |
| 2005/0027420 A1* | 2/2005 | Fujishima | E02F 9/2045 |
| | | | 701/50 |
| 2009/0085311 A1* | 4/2009 | Kim | B62D 33/0617 |
| | | | 280/6.154 |
| 2012/0232763 A1* | 9/2012 | Mizuochi | B66C 23/905 |
| | | | 701/50 |
| 2013/0066527 A1* | 3/2013 | Mizuochi | E02F 9/264 |
| | | | 701/50 |
| 2014/0271074 A1* | 9/2014 | Ogawa | E02F 3/436 |
| | | | 414/687 |
| 2015/0127212 A1* | 5/2015 | Chacon | B60R 21/013 |
| | | | 701/32.4 |
| 2015/0308826 A1* | 10/2015 | Seki | E02F 9/264 |
| | | | 33/293 |
| 2019/0003152 A1* | 1/2019 | Nakamura | E02F 9/264 |

FOREIGN PATENT DOCUMENTS

| | | |
|---|---|---|
| JP | 2009-197436 A | 9/2009 |
| JP | 2010-138657 A | 6/2010 |
| JP | 2013-238097 A | 11/2013 |
| WO | 2011/148946 A1 | 12/2011 |
| WO | 2012/169531 A1 | 12/2012 |

* cited by examiner

▓ UNSTABLE
▨ ARM ATTENTION
▥ BOOM ATTENTION
╱ SAFETY

EXCAVATOR

INCORPORATION BY REFERENCE

The entire contents of Japanese Patent Application No. 2016-072763 filed on Mar. 31, 2016, and of International Patent Application No. PCT/JP2017/012648 filed on Mar. 28, 2017, on the basis of each of which priority benefits are claimed in an accompanying application data sheet, are incorporated herein by reference.

BACKGROUND

Technical Field

The present invention relates in particular embodiments to an excavator.

Description of Related Art

Excavators mainly comprise an undercarriage (also referred to as a crawler loader), a rotating platform, and an attachment. The rotating platform is rotatably attached to the undercarriage and the position of the rotating platform is controlled by a turning motor. The attachment is attached to the rotating platform and is composed of a boom, an arm, and a bucket having respective shafts that can be manipulated independently.

SUMMARY

According to an embodiment of the present invention, there is provided an excavator including: an undercarriage; a rotating platform rotatably provided on the undercarriage; an attachment attached to the rotating platform; and a display unit that visually displays a predicted stability indicating stability of the excavator's posture upon the attachment being manipulated.

According to another embodiment of the present invention, there is provided an excavator including: an undercarriage; a rotating platform rotatably provided on the undercarriage; an attachment attached to the rotating platform; a stability calculation unit that calculates the predicted stability indicating stability of the excavator's posture of the upon attachment manipulation, according to current status conditions of the excavator based on assumed operator manipulations of the attachment; and a display unit that visually displays the predicted stability.

DETAILED DESCRIPTION

An excavator is designed to not overturn regardless of the posture of its attachment, as long as the excavator is static on a somewhat flat work field. However, if the attachment is controlled in a state where the work field is inclined, or a large amount of earth and sand are loaded in the bucket, there is a concern that overturning may occur. In the related art, an operator experiencing instability in the body of the excavator and perceiving a possibility of its overturning means that the manipulation lever(s) must be finely adjusted. Accordingly, in the related art, prevention of overturning is greatly dependent on the operator's skill; if the operator's reaction is delayed, the excavator may overturn.

It is desirable to prevent overturning of an excavator.

According to an embodiment of the present invention, it is possible to visually and intuitively acquire information on whether or not the posture of the excavator is unstable (or stable) before a lever is manipulated, and thus, it is possible to prevent overturning or shaking of the excavator.

Based on a current state of the excavator, a relationship between at least one of a position of a bucket, a speed of the attachment, power of the attachment, a manipulation variable of manipulating means of the attachment, and a change of the manipulation variable after the attachment is manipulated and the predicted stability may be visually displayed on the display unit.

The display unit may display the predicted stability with gradient.

The display unit may distinguishably display an area in which the attachment is operable without restriction and an area in which an operation of the attachment is to be restricted.

The predicted stability is changed according to an inclination angle of the excavator which is a status condition of the excavator. The position of the bucket at which a vehicle body is unstable, or an operation of the attachment is changed according to a situation of an inclination of a work field. By considering the inclination, it is possible to correctly calculate stability The predicted stability may be changed according to a turning angle of the upper turning body which is a status condition of the excavator. In a case where the upper turning body and the traveling body are directed in the same direction as each other (in a case where the turning angle is 0°) and in a case where the upper turning is turned by 90°, the vehicle body is unstable in the case where the upper turning is turned by 90°. Accordingly, by considering the turning angle, it is possible to correctly calculate the stability.

The predicted stability may be changed according to weight of a bucket which is a status condition of the excavator. The position of the bucket or the operation of the attachment where the vehicle body is unstable is changed according to weight of earth and sand loaded on the bucket or weight of a load at the time of a crane mode. Accordingly, by considering the weight of the bucket, it is possible to appropriately estimate the stability.

The predicted stability may be changed according to an engine rotation speed (a rotation speed of a hydraulic pump) which is a status condition of the excavator. A base value (upper limit value) of an amount of pressurized oil discharged from the hydraulic pump is changed, and thus, a speed of the attachment is changed as a matter of fact.

Accordingly, by considering the rotation speed of the engine, it is possible to appropriately estimate the stability.

The predicted stability may be changed according to setting of an operation mode (for example, a power mode, a normal mode, an eco-mode, or the like) of the excavator relating to a workload which is a status condition of the excavator. A behavior of the excavator with respect to the same manipulation input is changed according to the operation mode, and thus, by considering the operation mode, it is possible to appropriately estimate the stability.

The display unit may distinguishably display an area in which an operation of an arm shaft is to be restricted and an area in which an operation of a boom shaft is to be restricted. According to the position of the bucket, there are cases where driving of the arm shaft causes the overturning and driving of the boom shaft cause the overturning. By distinguishably displaying the cases, it is possible to further increase the safety.

The display unit may display the predicted stability as a diagram when the attachment is viewed from a side. The display unit may display the current posture of the attachment in conjunction with the relationship.

The display unit may superimpose the predicted stability on a real field of view to display the predicted stability.

The display unit may display the predicted stability by a graph and may display a current stability together.

The excavator may further include a stability calculation unit which calculates the predicted stability indicating the stability of the posture of the excavator after a manipulation based on a current status condition of the excavator assuming that an operator manipulates the attachment.

According to an embodiment of the present invention, before a lever is manipulated, the operator can visually and intuitively acquire information on whether or not the posture of the excavator is unstable (or stable) in a case where the lever is manipulated, and thus, it is possible to prevent overturning or shaking of the excavator.

The stability calculation unit may calculate the predicted stability with at least one of the position of the bucket, the speed of the attachment, and power of the attachment as a parameter. The display unit may visually display a relationship between the parameter and the predicted stability. In this case, an input of a manipulation which makes the posture of the excavator unstable, specifically, a position of the moved bucket which makes the posture of the excavator unstable, a movement speed of the attachment which makes the posture of the excavator unstable, power of the attachment which makes the posture of the excavator unstable can be visually presented to an operator.

In addition, embodiments of the present invention include any combination of the above-described elements and mutual substitution of elements or expressions of the present invention among methods, apparatuses, systems, or the like.

According to the present invention, it is possible to prevent overturning of the excavator.

Hereinafter, preferred embodiments of the present invention will be described with reference to the drawings. Identical or equivalent constituent elements, members, and processes shown in the drawings are denoted by the same reference numerals and overlapping descriptions thereof will be appropriately omitted. In addition, the embodiment is not limited to the invention but is an example, and all the features and combinations thereof described in the embodiments are not necessarily essential to the invention.

In the present specification, "a state in which a member A and a member B are connected to each other" includes not only a case where the member A and the member B are physically connected to each other directly but also a case where the member A and the member B are indirectly connected to each other via other members which do not substantially affect an electric connection state or do not impair functions or effects exerted by the connection.

Figure 1:
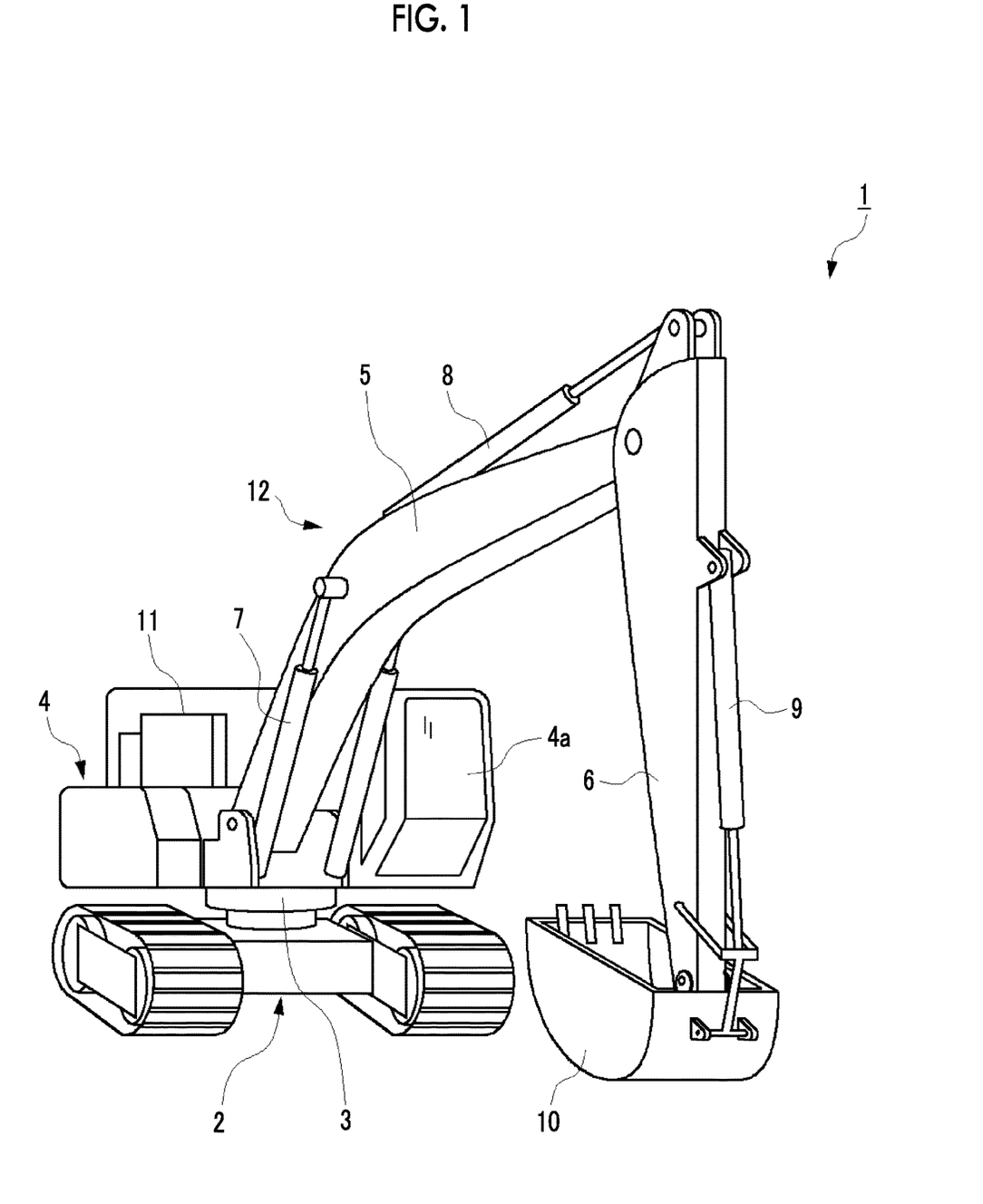
FIG. 1 is a perspective view showing an appearance of an excavator according to an embodiment.

FIG. 1 is a perspective view showing an appearance of an excavator 1 according to an embodiment. The excavator 1 mainly includes an undercarriage (also referred to crawler loader) 2 and a rotating platform 4 which is rotatably mounted on an upper portion of the undercarriage 2 via a turning device 3.

An attachment 12 is attached to the rotating platform 4. A boom 5, an arm 6 which is link-connected to a tip of the boom 5, a bucket 10 which is link-connected to a tip of the arm 6 are attached to the attachment 12. The bucket 10 is a device for capturing suspended loads such as earth and sand and steel materials. The boom 5, the arm 6, and the bucket 10 are respectively driven hydraulically by a boom cylinder 7, an arm cylinder 8, and a bucket cylinder 9. In addition, in the rotating platform 4, a cab 4a in which an operator (driver) is accommodated or a power source such as an engine 11 for generating a hydraulic pressure is provided. For example, the engine 11 is configured by a diesel engine.

Figure 2:
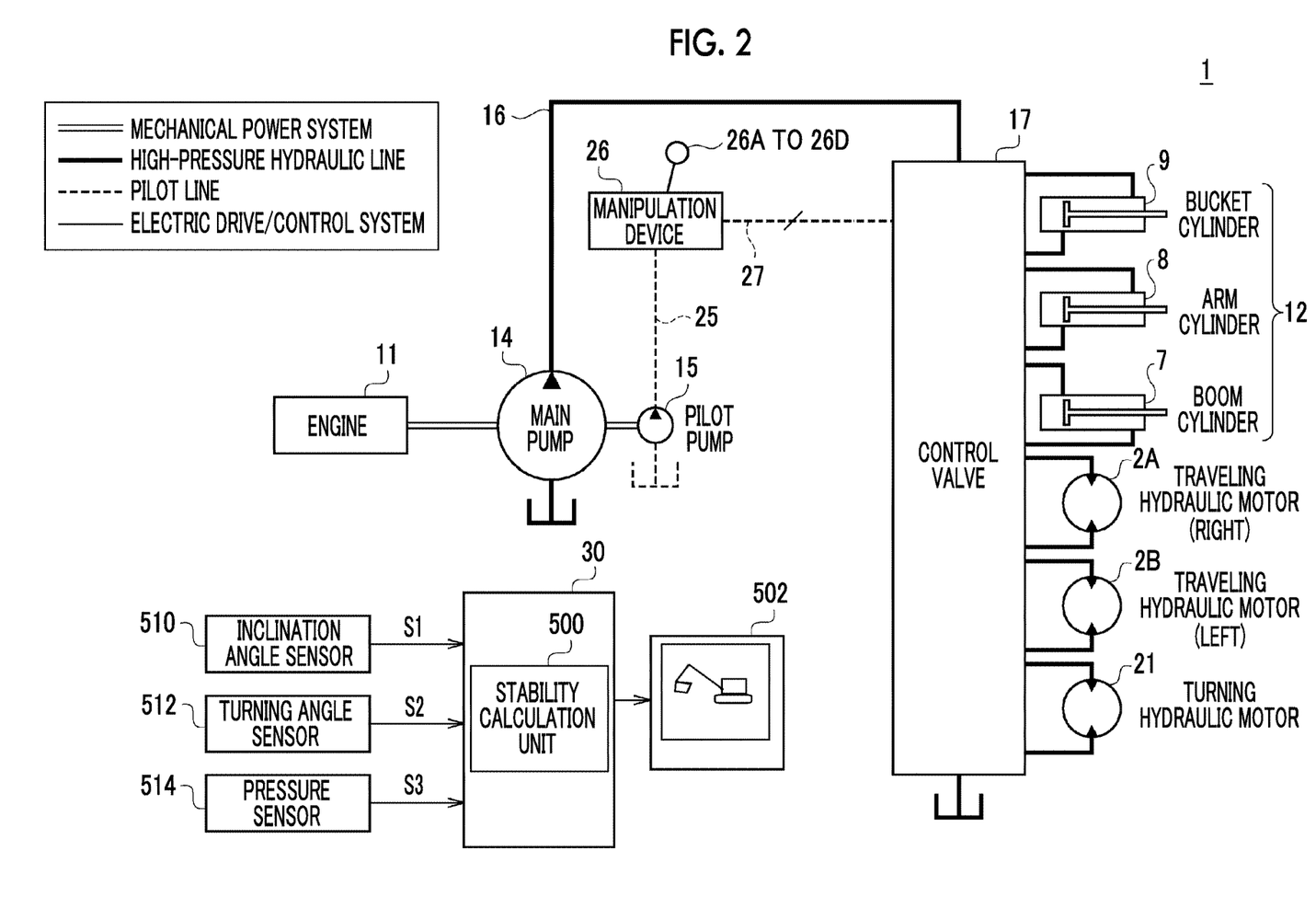
FIG. 2 is a block diagram of an electric system and a hydraulic system of the excavator according to the embodiment.

FIG. 2 is a block diagram of an electric system and a hydraulic system of the excavator 1 according to the embodiment. In addition, in FIG. 2, a system which mechanically transmits power is indicated by a double line, a hydraulic system is indicated by a thick solid line, a steering system is indicated by a broken line, and an electric system is indicated by a thin solid line. Moreover, here, a hydraulic excavator is described. However, the present invention can be applied to a hybrid excavator which uses a motor to perform the turning.

An engine 11 which is a mechanical drive section is connected to a main pump 14 and a pilot pump 15 which are a hydraulic pump. A control valve 17 is connected to the main pump 14 via a high-pressure hydraulic line 16. In addition, two hydraulic circuits for supplying a hydraulic pressure to a hydraulic actuator may be provided, and in this case, the main pump 14 includes two hydraulic pumps. In the present specification, for easy understanding, a case where the main pump is one system will be described.

The control valve 17 is a device for controlling a hydraulic system in the excavator 1. The boom cylinder 7, the arm cylinder 8, and the bucket cylinder 9 in addition to traveling hydraulic motors 2A and 2B for driving the undercarriage 2 shown in FIG. 1 are connected to control valve 17 via a high-pressure hydraulic line, and the control valve 17 controls hydraulic pressures (control pressures) supplied to these according to the manipulation input of the operator.

In addition, a turning hydraulic motor 21 for driving the turning device 3 is connected to the control valve 17. The turning hydraulic motor 21 is connected to the control valve 17 via a hydraulic circuit of a turning controller. However, in FIG. 3, the hydraulic circuit of the turning controller is not shown for simplification.

The manipulation device 26 (manipulating means) is connected to the pilot pump 15 via a pilot line 25. The manipulation device 26 is manipulating means for manipulating the undercarriage 2, the turning device 3, the boom 5, the arm 6, and the bucket 10, and is manipulated by the operator. The control valve 17 is connected to the manipulation device 26 via a hydraulic line 27.

For example, the manipulation device 26 includes hydraulic pilot type manipulation levers 26A to 26D. The manipulation levers 26A to 26D are levers which respectively correspond to the boom shaft, the arm shaft, the bucket shaft, and the turning axis. Actually, two manipulation levers are provided, two shafts are allocated to a vertical direction and a horizontal direction of the one manipulation lever, and remaining two shafts are allocated to a vertical direction and a horizontal direction of the remaining manipulation lever. Moreover, the manipulation device 26 includes a pedal (not shown) for controlling the traveling shaft.

The manipulation device 26 converts a hydraulic pressure (primary hydraulic pressure) supplied through the pilot line 25 into a hydraulic pressure (secondary hydraulic pressure) corresponding to the manipulation variable of the operator and outputs the converted pressure. The secondary hydraulic pressure (control pressure) output from the manipulation device 26 is supplied to the control valve 17 through the hydraulic line 27. Moreover, in FIG. 2, one hydraulic line 27 is shown. However, actually, the hydraulic line of the control command value is present in each of a left traveling hydraulic motor, a right traveling hydraulic motor, and the turning.

The controller 30 is a main controller which performs a drive control of the excavator 1. The controller 30 is configured of a calculation processing device including a central processing unit (CPU) and an internal memory and is realized by the CPU executing a drive control program stored in the memory.

Moreover, a stability calculation unit 500 and a display unit 502 are provided in the excavator 1. In the present embodiment, the stability calculation unit 500 is mounted as one function of the controller 30. In addition, the stability calculation unit 500 may be mounted as hardware separated from the controller 30.

The stability calculation unit 500 determines predicted stability (unpredicted stability) of a posture of the excavator 1. The predicted stability of the posture can be ascertained as an index indicating a possibility of overturning of the excavator 1. The predicted stability is the index which indicates the stability of the posture of excavator 1 as two values (safety and unsafety) or multi values of three or more.

The stability calculation unit 500 calculates the predicted stability indicating the stability of the posture of the excavator 1 after the manipulation based on a current status condition of the excavator 1 assuming that the operator manipulates the attachment 12. The display unit 502 visually displays predicted stability calculated by the stability calculation unit 500.

Accordingly, in a case where a lever is manipulated, the operator can visually and intuitively know information on whether or not the posture of the excavator 1 is unstable (or stable) before the lever is manipulated, and thus, it is possible to prevent the overturning or shaking of the excavator 1.

For example, the stability calculation unit 500 calculates the predicted stability with at least one of a position of the bucket 10, a speed of the attachment 12, and power of the attachment 12 as a parameter. The display unit 502 visually displays a relationship between the parameter and the predicted stability.

In a case where the position of the bucket 10 is the parameter, the stability calculation unit 500 calculates the stability of the posture of the excavator 1 for each assumed position when the bucket 10 moves to each of a plurality of assumed positions at which the bucket 10 can reach. The display unit 502 visually displays a relationship between the plurality of assumed positions and the predicted stability.

In a case where the speed of the attachment 12 is the parameter, the stability calculation unit 500 calculates the stability of the posture of the excavator 1 for each assumed speed when the attachment 12 moves at a plurality of assumed speeds. The display unit 502 visually displays a relationship between the plurality of assumed speeds and the predicted stability.

In a case where the power of the attachment 12 is the parameter, the stability calculation unit 500 calculates the stability of the posture of the excavator 1 for each assumed power when the attachment 12 is moved by a plurality of assumed power. The display unit 502 visually displays a relationship between the plurality of assumed power and the predicted stability.

The speed of the attachment 12 may be a speed of the boom 5, may be a speed of the arm 6, or may be the speed of the bucket 10 obtained from a combination thereof. Similarly, the power of the attachment 12 may be power of the boom 5, may be power of the arm 6, or may be power of the entire attachment 12 obtained from a combination thereof.

According to these controls, a position of the moved bucket 10 which makes the posture of the excavator 1 unstable, a movement speed of the attachment 12 which makes the posture of the excavator 1 unstable, and power of the attachment 12 which makes the posture of the excavator 1 unstable can be visually presented to the operator.

By considering an inclination angle θ of the vehicle body, a relative turning angle φ between the rotating platform 4 and the undercarriage 2, and a load weight M of the bucket 10 as the current status condition of the excavator 1, the stability calculation unit 500 calculates the predicted stability of the posture of the excavator 1 based on these.

For example, the position of the center of gravity of the excavator 1 is calculated, whether or not the position of the center of gravity of the excavator 1 falls within a range of the undercarriage 2 or whether or the position of the center of gravity protrudes to the outside of the undercarriage 2 (or how far the position protrudes) is estimated, and thus, the predicted stability of the posture of the excavator 1 can be calculated.

The display unit 502 includes a display attached to the cab 4a. The display may be a dedicated display for displaying the predicted stability (safety) or may share a display for displaying other information.

Figure 3A:
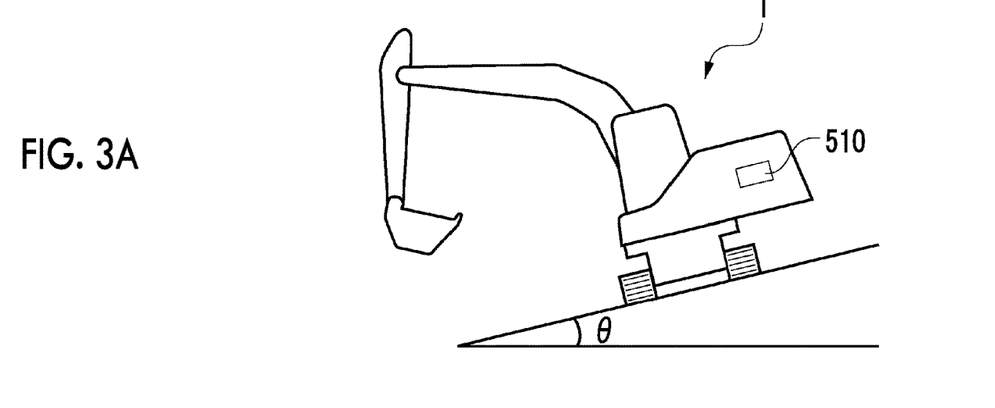
FIGS. 3A to 3C are diagrams explaining a state of the excavator used in calculation of predicted stability of the excavator.
Figure 3B:
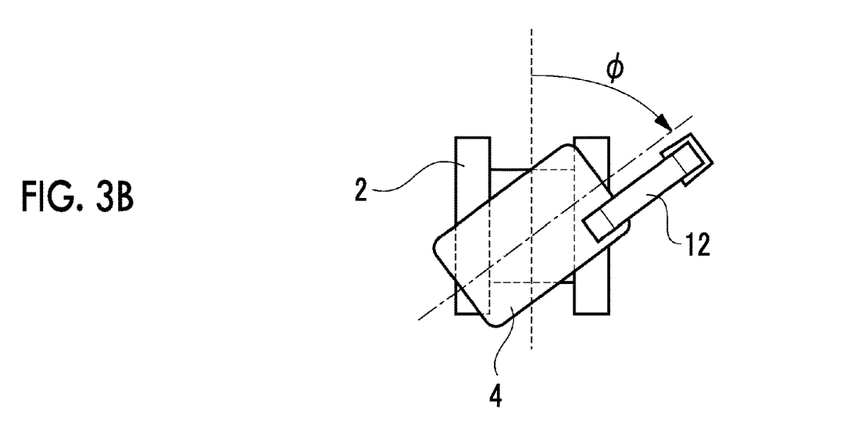
Figure 3C:
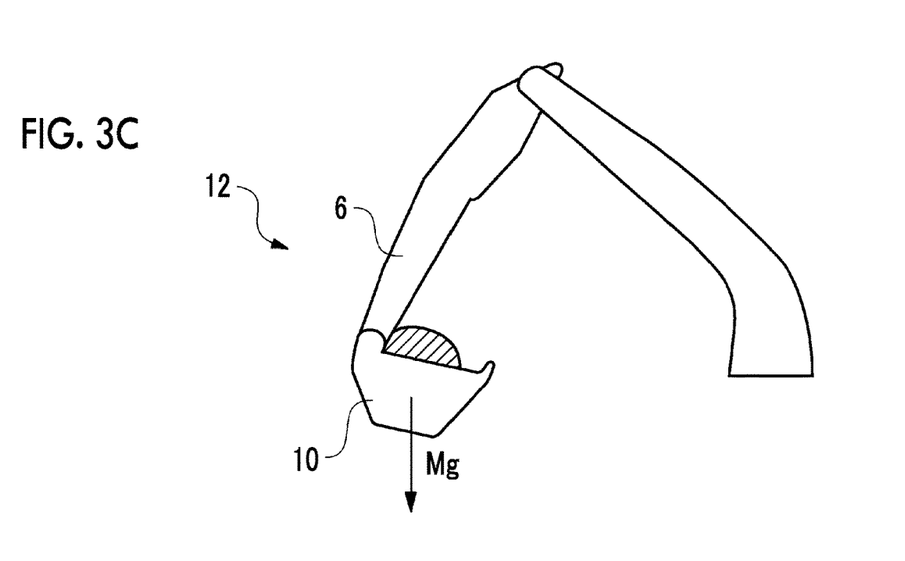

FIGS. 3A to 3C are diagrams explaining a status condition of the excavator 1 used in calculation of the predicted stability of the excavator 1. In the present embodiment, considering information S1 relating to the inclination angle of the excavator 1, information S2 relating to a turning angle of the rotating platform 4, and information S3 relating to weight of the bucket 10, the stability calculation unit 500 calculates the predicted stability.

In FIG. 3A, the inclination angle θ of the excavator 1 is shown. The inclination angle θ can be acquired by an inclination angle sensor 510 mounted on the excavator 1.

In FIG. 3B, a turning angle φ of the rotating platform 4 is shown. The turning angle φ is generated based on an output S2 of a turning angle sensor 512. For example, as the turning angle sensor 512, a gyro sensor, an encoder, or a resolver may be used.

In FIG. 3C, the load weight M of the bucket 10 is shown. The load weight M may be assumed from a cylinder thrust (can be calculated from a difference between a bottom pressure and a rod pressure) obtained from the pressure sensor 514. Any weight sensor may be provided in the bucket 10.

In a case where the power or the speed of the attachment 12 is selected as the parameter when the predicted stability is calculated, the current state of the attachment 12 may be considered. In this case, the predicted stability may be calculated based on an output from a sensor for measuring the posture of the attachment 12. As the sensor for measuring the posture, an encoder or a potentiometer can be used. However, the sensor is not particularly limited to this.

Some embodiments of the displays of the predicted stability performed by the display unit 502 will be described.

First Embodiment

Figure 4A:
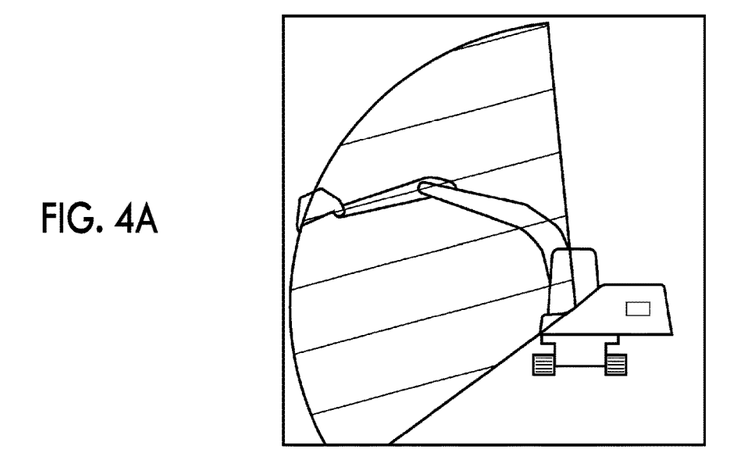
FIGS. 4A to 4C are diagrams showing displays of a display unit according to a first embodiment.
Figure 4B:
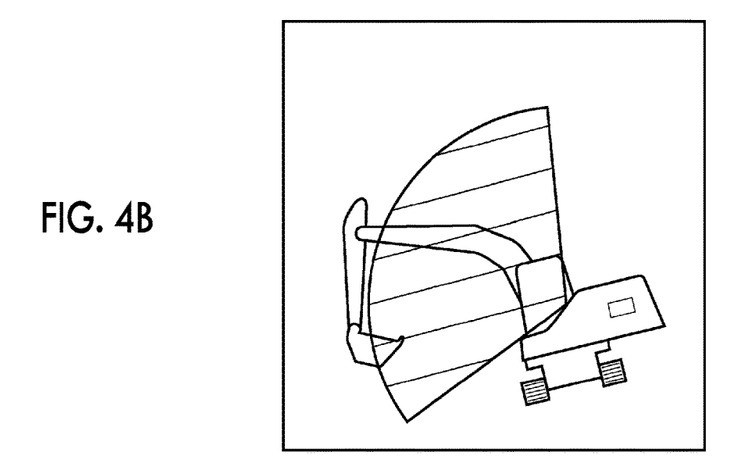
Figure 4C:
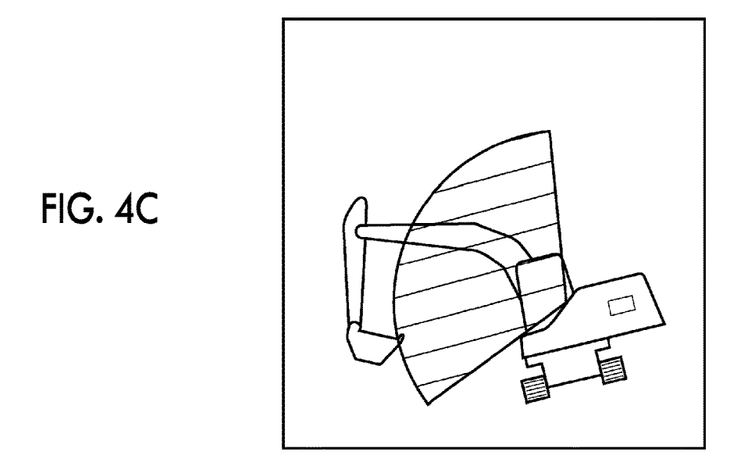

FIGS. 4A to 4C are diagrams showing displays of the display unit 502 according to a first embodiment. In the first embodiment, the position of the bucket 10 is used as the parameter, and a relationship between the position of the bucket 10 and the predicted stability is visually shown. The predicted stability is two values such as safe and unsafe. Alternatively, the predicted stability is calculated by three or more values, and may be converted into two values by comparing the three or more values with a predetermined threshold. The display unit 502 displays the predicted stability as a lateral diagram when the attachment 12 is viewed from the side. In this embodiment, the movable range (stable range) of the bucket 10 within which the excavator 1 is stable, and an area in which the excavator 1 is unstable are partitioned and displayed. In FIGS. 4A to 4c, the display unit 502 displays the stable range in an emphatic manner.

On the other hand, the display unit 502 may display a range in which the excavator 1 is unstable, that is, a range (unstable range) in which there is a concern of the overturning, in an emphatic manner.

In FIGS. 4A to 4C, the inclination angles θ are different from each other, and thus, it is shown that the movable range decreases as the inclination angle increases. The current posture of the excavator 1 is displayed on the display unit 502 together.

According to this embodiment, the operator can confirm a movement distance of the bucket 10 at which problems do not occur, before the operation in the current status condition of the excavator 1.

Second Embodiment

Figure 5A:
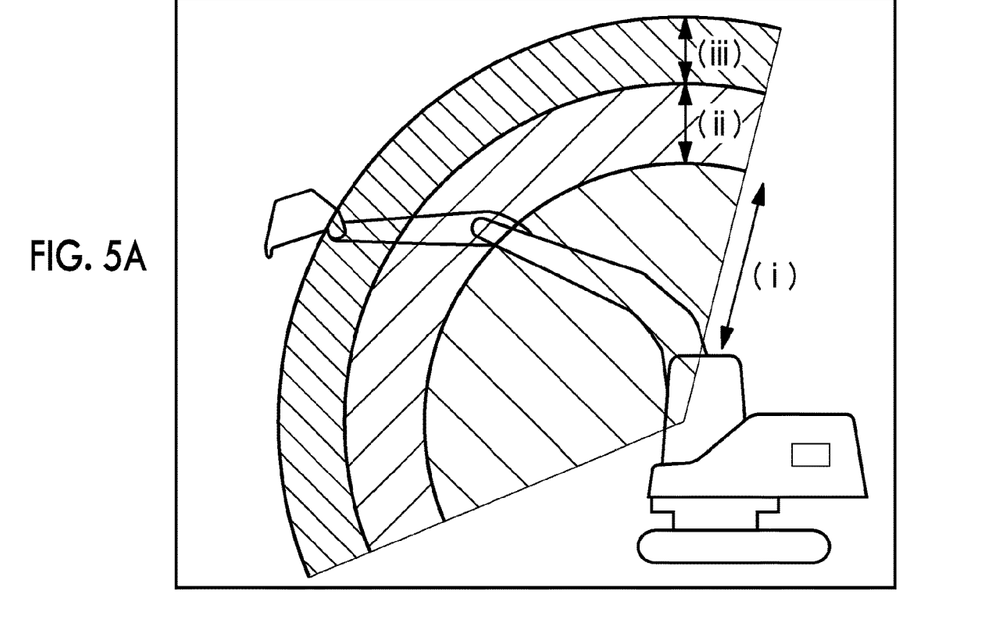
FIGS. 5A and 5B are diagrams showing displays of a display unit according to a second embodiment.
Figure 5B:
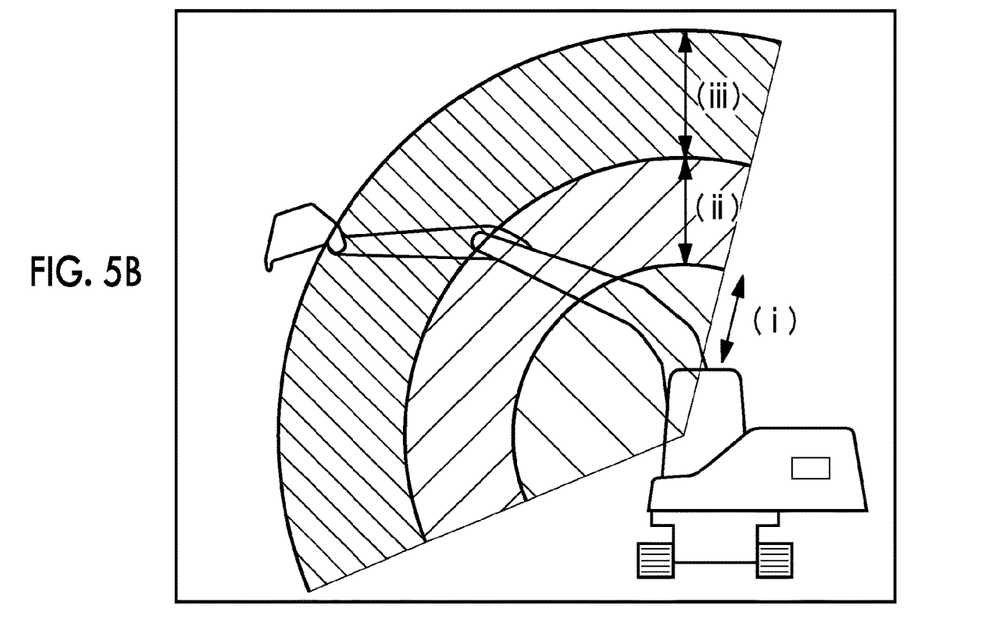

FIGS. 5A and 5B are diagrams showing displays of the display unit 502 according to a second embodiment. In the second embodiment, the posture of the attachment 12, more specifically, the position of the bucket 10 is the parameter, and a relationship between the position of the bucket 10 and the predicted stability is visually shown. In this embodiment, the predicted stability is shown by three values and is partitioned into an area for each value to be displayed. A first area (i) indicates a safe area, a second area (ii) indicates an area requiring attention, and a third area (iii) indicates an unstable area.

The display of each of the areas (i) to (iii) can be associated with the operation of the attachment 12. That is, the first area (i) can be ascertained as an area in which there is no problem even when the attachment 12 moves at a high speed, in other words, an area which can be operated without restriction even when the attachment 12 moves at a high speed. The second area (ii) is an area where the speed (or power) of the attachment 12 is lowered to be operated at a low speed to a medium speed, and the third area (iii) is an area where the attachment 12 is to be operated at a low speed (low power).

When viewed from another viewpoint, in the displays of the second embodiment, the area (i) in which the attachment 12 can be operated without restriction and the areas (ii) and (iii) in which the operation of the attachment should be restricted are distinguishably displayed.

When viewed from still another viewpoint, in the displays of the second embodiment, the predicted stability of the excavator 1 is visually shown with both the position of the bucket and the speed (or power) of the attachment 12 as parameters.

In FIGS. 5A and 5B, the turning angles φ are different from each other. In FIG. 5B, the turning angle φ is 90°, a width of the undercarriage 2 is narrower than that of FIG. 5A, and thus, the overturning easily occurs. Accordingly, the first area (i) of FIG. 5B is narrower than that of FIG. 5A.

According to this embodiment, the operator can confirm a movement distance of the bucket 10 at which problems do not occur, before the operation in the current status condition of the excavator 1. Alternatively, the operator can confirm the speed of the bucket 10 or the power for moving the bucket 10 in which problems do not occur, before the operation.

Third Embodiment

Figures 6A, 6B:
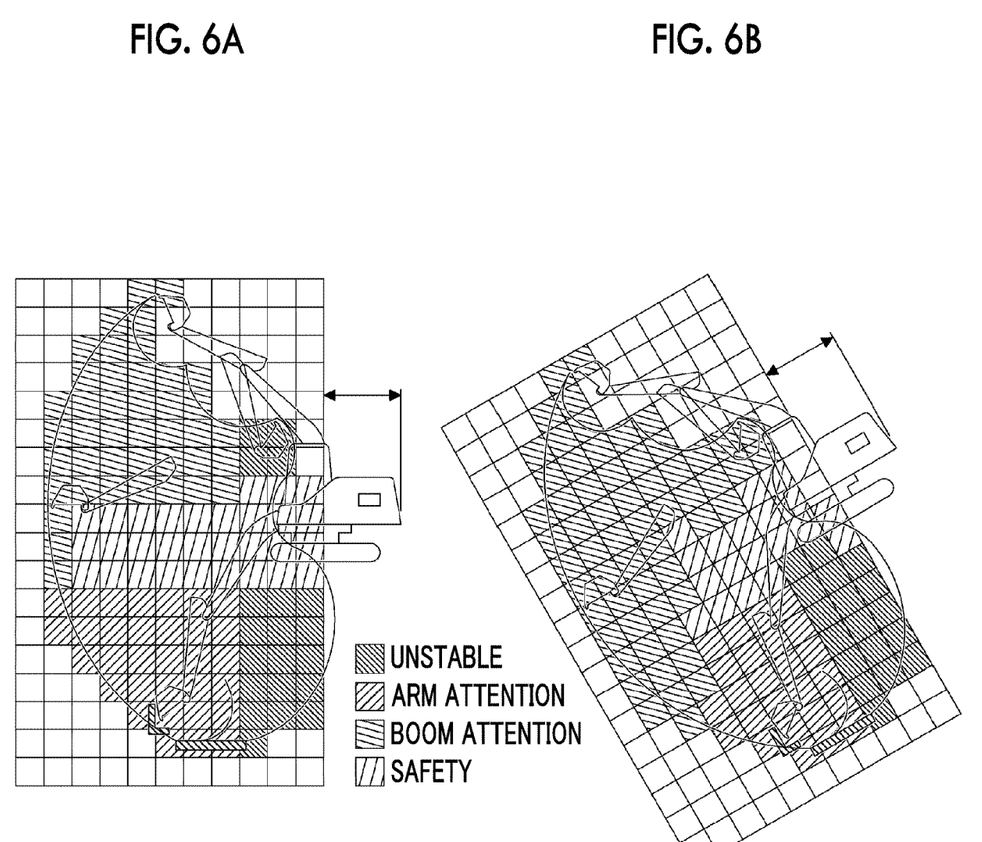
FIGS. 6A to 6C are diagrams showing displays of a display unit according to a third embodiment.
Figure 6C:
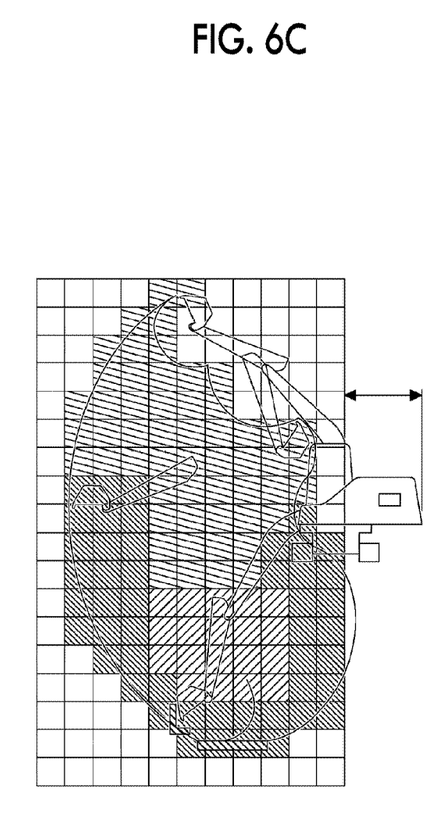

FIGS. 6A to 6C are diagrams showing displays of the display unit 502 according to a third embodiment. In FIGS. 6A and 6B, the inclination angles of the excavator are different from each other, FIG. 6A indicates stability on a flat ground, and FIG. 6B indicates stability on a slope. In addition, in FIGS. 6A and 6C, the turning angles of the rotating platform 4 are different from each other, FIG. 6A indicates the stability when the attachment 12 and the undercarriage 2 are directed in the same direction as each other, and FIG. 6C indicates the stability when the attachment 12 is directed in a direction perpendicular to the undercarriage 2. In this embodiment, a working area is partitioned into a matrix, and the predicted stability is indicated by a color coding or a pattern division for each partition. In this embodiment, an area (arm attention) in which an operation of the arm shaft should be restricted and an area (boom attention) in which an operation of the boom shaft should be restricted are distinguishably displayed. Accordingly, the operator can intuitively know the shaft to which the manipulation input should be limited. The display of each area in FIGS. 6A to 6C is an example. For example, the stable area of FIG. 6B is larger than that of FIG. 6C. However, this does not necessarily mean that the operation at the slope is more stable than the operation at the turning angle of 90°. Of course, according to parameters such as the load weight of the bucket or an engine output, or the inclination angle, the safe area in the operation of the turning angle of 90° may be larger than that in the operation on the slope.

According to this embodiment, the operator can confirm a drive area of the boom or the arm in which problems do not occur, before the operation in the current status condition of the excavator 1.

Fourth Embodiment

Figure 7:
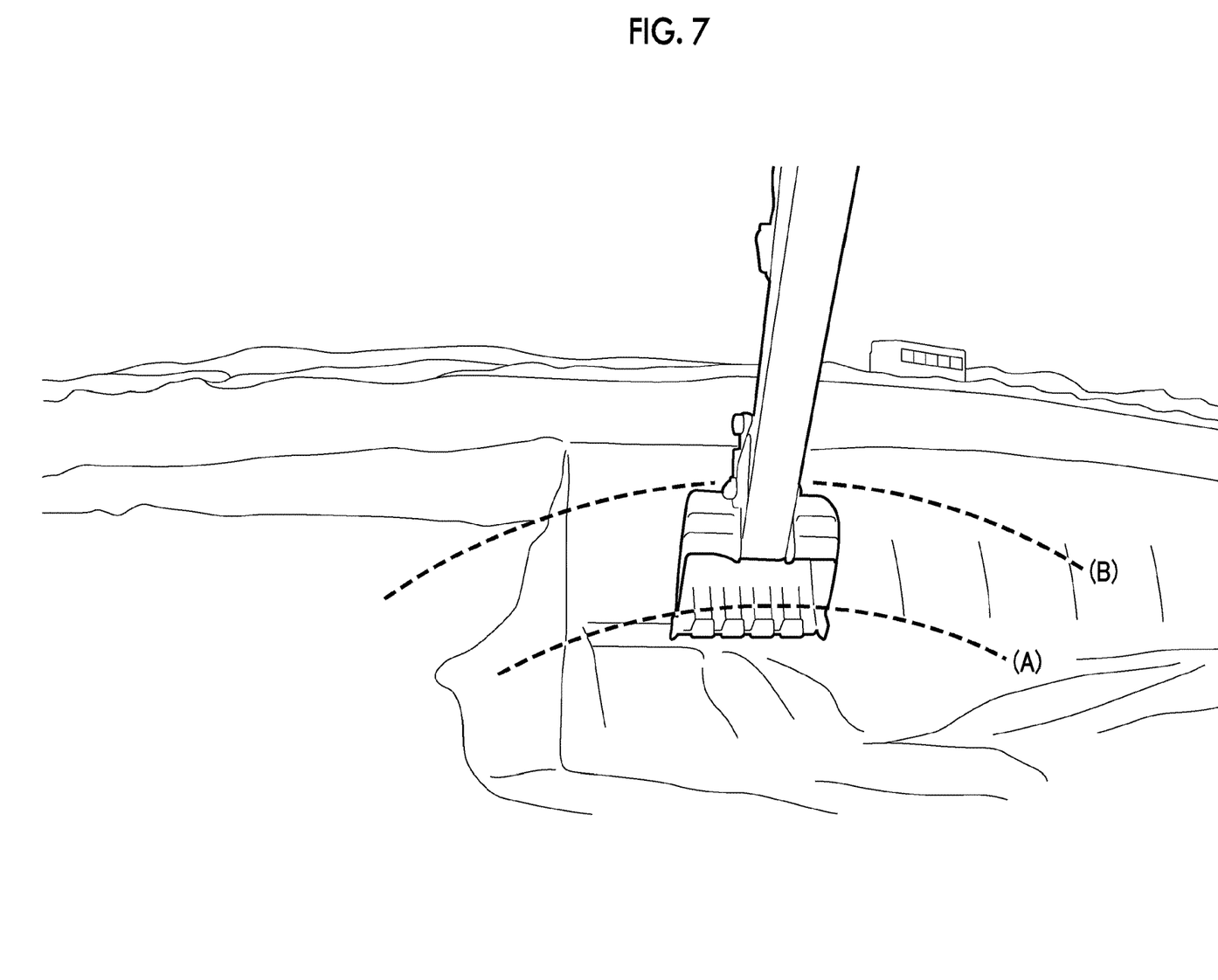
FIG. 7 is a diagram showing a display of a display unit according to a fourth embodiment.

FIG. 7 is a diagram showing a display of the display unit 502 according to a fourth embodiment. In this embodiment, the stability is displayed on a windshield in a superimposed form. For example, a display panel for displaying boundary lines A and B may be embedded in windshield, and boundary lines A and B may be overlapped with the real field of view seen beyond the windshield. For example, the safe area (first area in FIG. 5) may correspond to an area positioned in front of a boundary line A, an attention area (second area in FIG. 5) may correspond to an area between the boundary lines A and B, and an unstable area (third area in FIG. 5) may correspond to an area beyond the boundary line B. Instead of displaying the boundaries, the partition or the color coded (pattern divided) block of FIG. 6 may be displayed. By superimposing a real field of view and the display of the predicted stability, the operator can ascertain more intuitively the manipulation which can cause overturning and shaking.

Fifth Embodiment

In addition, in a case where a field view monitor which presents a periodic image including a blind spot of the excavator 1 to the operator is mounted, according to this, the predicted stability may be displayed on the field view monitor. Alternatively, the predicted stability may be displayed on a display provided corresponding to an Information and Communication Technology (ICT).

Sixth Embodiment

Figure 8:
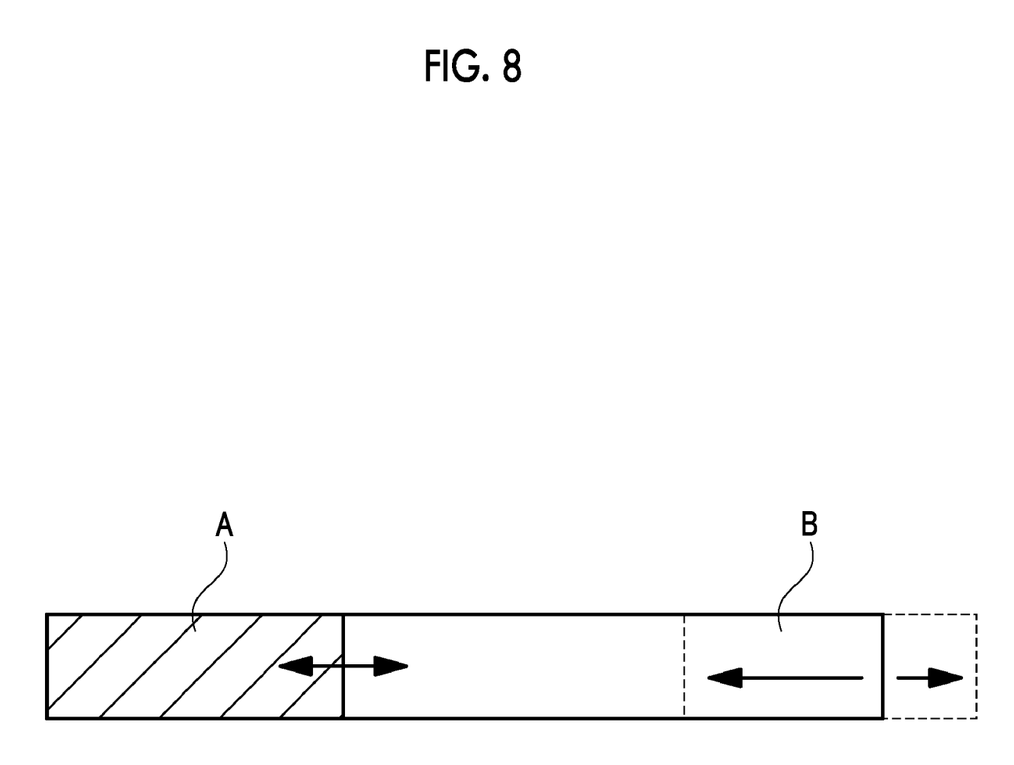
FIG. 8 is a diagram showing a display of a display unit according to a sixth embodiment.

In FIGS. 4 to 7, although the predicted stability is displayed in two dimensions. However, the present invention is not limited thereto, and the predicted stability may be displayed in one dimension. FIG. 8 is a diagram showing a display of the display unit according to a sixth embodiment. In FIG. 8, a length of a bar B is changed depending on a situation where the excavator 1 is currently located. In a case where the same lever manipulate is performed, in a situation where it may be more unstable, the length of the bar B becomes shorter, which corresponds to narrowing of the stable area. The bar may be displayed in a vertical direction.

The current situation of the excavator 1 which influences the length of the bar B includes the weight of the bucket, the engine rotation speed, the operation mode, or the like in addition to a degree of the inclination (FIG. 6B), orientation of the rotating platform (FIG. 6C). These are referred to as base information.

For example, the bucket position where the vehicle body becomes unstable and the operation of the attachment is changed according to the weight of earth and sand loaded on the bucket or the weight of a cargo in a crane mode. Therefore, the bucket weight is suitable as the parameter for defining the length of the bar B.

The base value (upper limit value) of the amount of the pressurized oil discharged from the hydraulic pump is changed, and thus, the speed of the attachment is changed as a matter of fact. Therefore, the rotation speed of the engine is suitable as the parameter for defining the length of the bar B.

In addition, some excavators have switchable operation modes (for example, a power mode, a normal mode, an eco-mode, or the like). In this case, the behavior of the excavator for the same manipulation input is changed depending on the operation mode, and thus, the operation mode is suitable as the parameter for defining the length of the bar B.

Left ends of the bars A and B coincide with each other, and the bar A is changed within a range of the length of the bar B. The length of the bar A indicates the stability calculated from the manipulation (the posture of the attachment, acceleration of each shaft, or the like) of the attachment and as the length of the bar A approaches the length of bar B, the posture of the excavator is unstable. The lengths of the bars A and B may be changed continuously or discretely. In other words, a relative relationship between the bar A and the bar B indicates the predicted stability of the posture of the excavator.

(1) For example, the length of the bar A corresponds to the position of the center of gravity of the excavator, and the length of the bar B may indicate the range of the center of gravity where the excavator is stable. For example, as the bucket extends in a distal direction, the center of gravity of the excavator moves forward, and thus, the length of the bar A increases. Alternatively, even in a case where the bucket extends in a deep state, similarly, the center of gravity can be calculated, and the length of the bar A increases. For example, shortening of the bar B indicates that the posture of the excavator tends to be more unstable in a situation where the positions of the bucket are the same or the centers of gravity of the excavator are the same.

In addition, among the base information, the degree of the inclination, the orientation of the rotating platform, the weight of the bucket, or the like exactly influences the position of the center of gravity of the excavator, and thus, strictly, the length of the bar A is changed. However, it is preferable that the length of the bar A is dependent only on the manipulation of the manipulation lever without depending on the base information, and instead, the length of the bar B is changed based on the base information. As a result, in a case where the same manipulation is performed, the length of the bar A is the same, and thus, the stability (or instability) can be ascertained intuitively.

(2) As another example, the length of the bar A may indicate the magnitude of an overturn moment influencing the excavator and the length of the bar B may indicate a stable moment of the excavator. The overturn moment may be a static overturn moment which does not consider the momentum of the attachment.

More preferably, the length of the bar A may indicate a dynamic overturn moment considering the momentum of the attachment and the length of the bar B may indicate the stable moment of the excavator. For example, as the bucket extends in the distal direction (or the deep direction), the overturn moment increases, and thus, the length of the bar A increases. Alternatively, if the arm or the boom suddenly moves, that is, as the speed or acceleration of the attachment increases, the overturn moment caused by the momentum increases, and thus, the length of the bar A increases.

For example, shortening of the bar B may indicate that the excavator is easily inclined in a case where the posture of the attachment is the same or the in a case where the attachment moves at the same speed and at the same acceleration. Alternatively, the shortening of the bar B may indicate that the excavator easily slips or floats by an excavation reaction force in a case where the attachment is moved by the same power.

In addition, among the base information, the degree of the inclination, the orientation of the rotating platform, the weight of the bucket, or the like influences the overturn moment, and thus, strictly, changes of these change the length of the bar A. However, it is preferable that the length of the bar A is dependent only on the manipulation of the manipulation lever without depending on the base information, and instead, the length of the bar B is changed based on the base information. As a result, in a case where the same manipulation is performed, the length of the bar A is the same, and thus, the stability (or instability) can be ascertained intuitively.

As another example, an upper limit (right end) of the bar B retracting and the bar becoming shorter may indicate that the posture of the excavator tends to be unstable instantly if the manipulation is performed such that the manipulation (manipulation variable itself or sudden change of manipulation variable) of the manipulating means of the attachment becomes large.

(3) The length of the bar A may indicate the speed, the acceleration, or the power of the attachment, or may simpler indicate the manipulation variable of the arm or boom.

It should be noted that the display modes in the above-described embodiments may be switchable according to the status condition of the excavator 1 or a preference of the operator. For this purpose, switching means for switching the display modes, for example, switches or panels may be provided in the cab.

It should be understood that the invention is not limited to the above-described embodiment, but may be modified into various forms on the basis of the spirit of the invention. Additionally, the modifications are included in the scope of the invention.

The present invention can be used in an excavator.

What is claimed is:

1. An excavator comprising:
   an undercarriage;
   a rotating platform rotatably provided on the undercarriage;
   an attachment including a boom attached to the rotating platform and an arm link-connected to the boom; and
   a display unit that visually displays a predicted stability indicating stability of the excavator's posture upon the attachment being manipulated before an operator's manipulations of the attachment.

2. The excavator according to claim 1, wherein
   the display unit visually displays the predicted stability indicating stability of the excavator's posture upon the attachment being manipulated before the operator's manipulations of the attachment with respect to at least one of bucket position, attachment speed, attachment power, a manipulating-means manipulation variable, and change in the manipulating-means manipulation variable.

3. The excavator according to claim 1, wherein the display unit visually displays the predicted stability upon the attachment being manipulated as a gradient before the operator's manipulations of the attachment.

4. The excavator according to claim 1, wherein the display unit distinguishably displays an area in which the attachment is operable without restriction, and an area in which operation of the attachment should be restricted before the operator's manipulations of the attachment.

5. The excavator according to claim 1, wherein the predicted stability, upon the attachment being manipulated, is calculated before the operator's manipulations of the attachment changes according to an inclination angle of the excavator.

6. The excavator according to claim 1, wherein the predicted stability, upon the attachment being manipulated, is calculated before the operator's manipulations of the attachment changes according to a turning angle of the rotating platform.

7. The excavator according to claim 1, wherein the predicted stability, upon the attachment being manipulated, is calculated before the operator's manipulations of the attachment changes according to the bucket's weight.

8. The excavator according to claim 1, wherein the predicted stability, upon the attachment being manipulated, is calculated before the operator's manipulations of the attachment changes according to at least one of rpm of the excavator's engine and rpm of the excavator's hydraulic pump.

9. The excavator according to claim 1, wherein the predicted stability, upon the attachment being manipulated, is calculated before the operator's manipulations of the attachment changes according to a setting of an operation mode of the excavator relating to the excavator's workload.

10. The excavator according to claim 1, wherein, before the operator's manipulations of the attachment, the display unit distinguishably displays an area in which operation of an arm shaft for the attachment should be restricted, and an area in which operation of a boom shaft for the attachment should be restricted.

11. The excavator according to claim 1, wherein the display unit displays the predicted stability, upon the attachment being manipulated, is calculated before the operator's manipulations of the attachment as a diagram where the attachment is viewed laterally.

12. The excavator according to claim 1, wherein the display unit superimposes the predicted stability, upon the attachment being manipulated, is calculated before the operator's manipulations of the attachment, on an actual field of view to display the predicted stability.

13. The excavator according to claim 1, wherein the display unit displays the predicted stability, upon the attachment being manipulated is calculated before the operator's manipulations of the attachment, by a graph and displays the excavator's current stability together with the predicted stability.

14. The excavator according to claim 1, further comprising:
   a stability calculation unit that calculates the predicted stability, upon the attachment being manipulated, is calculated before the operator's manipulations of the attachment according to at least one of an inclination angle of the excavator, a turning angle of the rotating platform, bucket's weight, rpm of the excavator's engine and rpm of the excavator's hydraulic pump.

* * * * *